United States Patent [19]

Haraguchi

[11] Patent Number: 5,479,235
[45] Date of Patent: Dec. 26, 1995

[54] CAMERA WITH CAM-OPERATED MIRROR DRIVING MECHANISM

[75] Inventor: Shousuke Haraguchi, Kanagawa, Japan

[73] Assignee: Canon Kabushiki Kaisha, Tokyo, Japan

[21] Appl. No.: 278,325

[22] Filed: Jul. 21, 1994

Related U.S. Application Data

[62] Division of Ser. No. 145,675, Nov. 4, 1993, Pat. No. 5,408,290, which is a division of Ser. No. 886,318, May 22, 1992, Pat. No. 5,311,229, which is a continuation of Ser. No. 650,866, Feb. 5, 1991, abandoned.

[30] Foreign Application Priority Data

| Feb. 7, 1990 | [JP] | Japan | 2-027723 |
| Feb. 7, 1990 | [JP] | Japan | 2-027724 |
| Feb. 7, 1990 | [JP] | Japan | 2-027725 |

[51] Int. Cl.⁶ ............................. G03B 13/36; G03B 19/02
[52] U.S. Cl. ............................... 354/402; 354/152
[58] Field of Search ................................. 354/152, 402, 354/405, 407, 479

[56] References Cited

U.S. PATENT DOCUMENTS

| 4,331,402 | 5/1982 | Nihei | 354/59 |
| 4,545,667 | 10/1985 | Niwa et al. | 354/419 |
| 4,679,925 | 7/1987 | Kawamura et al. | 354/173.1 |
| 4,864,336 | 9/1989 | Fukahori et al. | 354/152 |
| 4,941,010 | 7/1990 | Aihara et al. | 354/407 |
| 5,012,267 | 4/1991 | Higashihara | 354/402 |
| 5,070,349 | 12/1991 | Haraguchi et al. | 354/152 |
| 5,130,740 | 7/1992 | Suda et al. | 354/479 |

FOREIGN PATENT DOCUMENTS 57-73725  5/1982  Japan.

*Primary Examiner*—W. B. Perkey
*Attorney, Agent, or Firm*—Fitzpatrick, Cella, Harper & Scinto

[57] ABSTRACT

A camera includes a movable mirror arranged to be movable between a finder-viewing position and an exposure-retracted position, a spring member for applying to the movable mirror a force which causes the movable mirror to move from the finder-viewing position to the exposure-retracted position, and a movement mechanism for causing the movable mirror to move. The movement mechanism is provided with a cam member arranged to be rotated by a drive source and a cam follower arranged in abutment with the cam member. During rotation of the cam follower in a first direction, the movement mechanism causes the movable mirror to move toward the exposure-retracted position by means of the urging force of the spring member and, during rotation of the cam follower in a second direction, causes the movable mirror to move toward the finder-viewing position against the urging force of the spring member. The camera also includes a submirror arranged to be movable with respect to the movable mirror, the submirror being located in a focus detecting position for reflecting subject light toward a focus detecting device when the movable mirror is located in the finder-viewing position. The submirror is interlockingly located in an exposure-retracted position when the movable mirror is located in the exposure-retracted position.

13 Claims, 15 Drawing Sheets

FIG.9

| SEQUENCE / SIGNAL | DETECTION PATTERN 23 | DETECTION PATTERN 24 |
|---|---|---|
| COMPLETION AND STOP OF SHUTTER CHARGE | Lo | Lo |
| START OF MIRROR-UP OPERATION | ⇩ | Lo |
| ENERGIZATION OF MOTOR 1 | Hi | Lo |
| BRAKING PHASE OF MOTOR 1 | Hi | ⇩ |
| STOP OF MIRROR-UP OPERATION | Hi | Hi |
| COMPLETION PHASE OF MIRROR-DOWN OPERATION | Hi | ⇩ |
| ENERGIZATION OF MOTOR 1 | Hi | Lo |
| " | Hi | ⇩ |
| " | Hi | Hi |
| FIRST BRAKING PHASE OF MOTOR 1 | ⇩ | Hi |
| ENERGIZATION OR BRAKING OF MOTOR 1 | Lo | Hi |
| SECOND BRAKING PHASE OF MOTOR 2 | Lo | ⇩ |
| COMPLETION AND STOP OF SHUTTER CHARGE | Lo | Lo |

F I G. 10
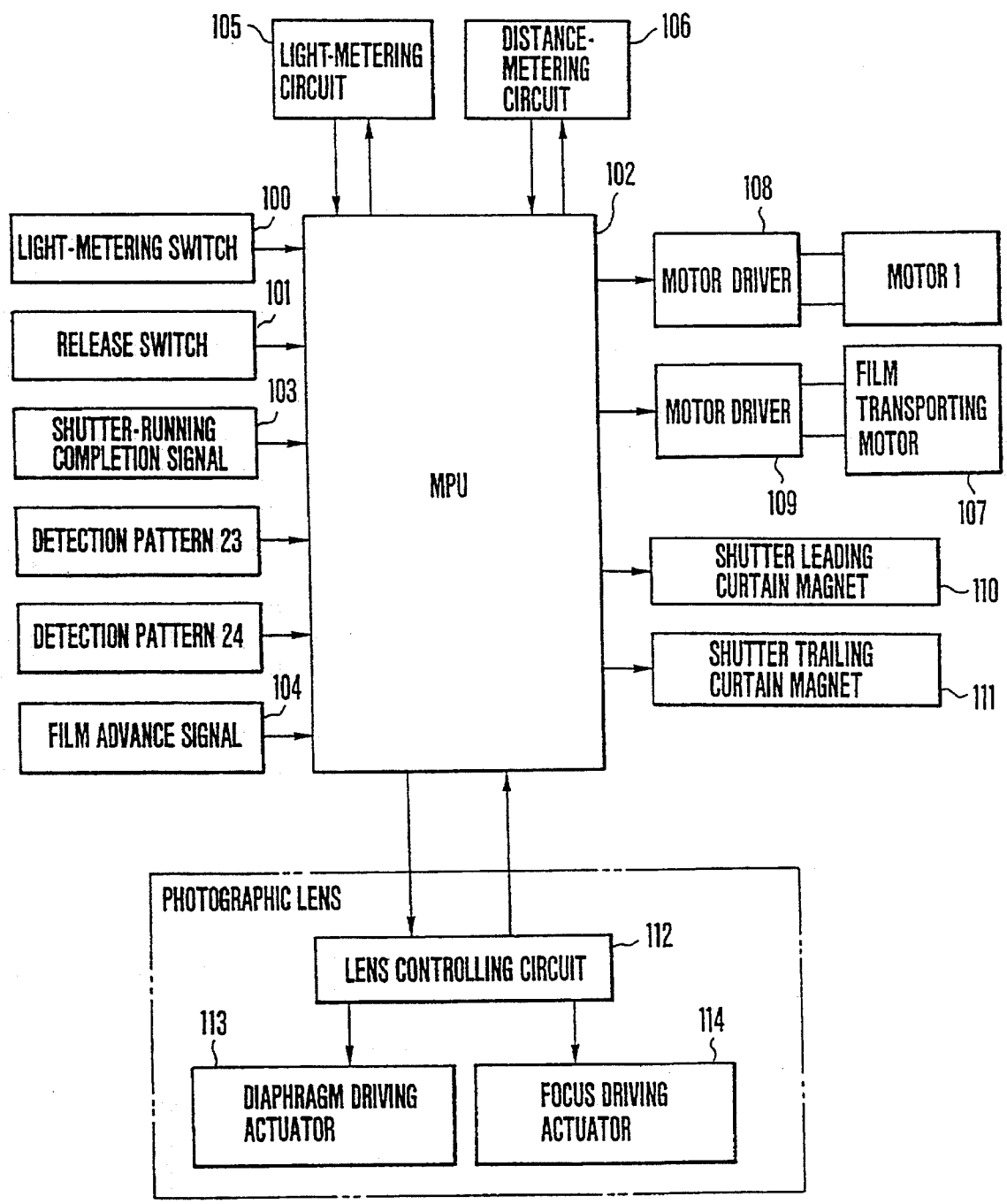

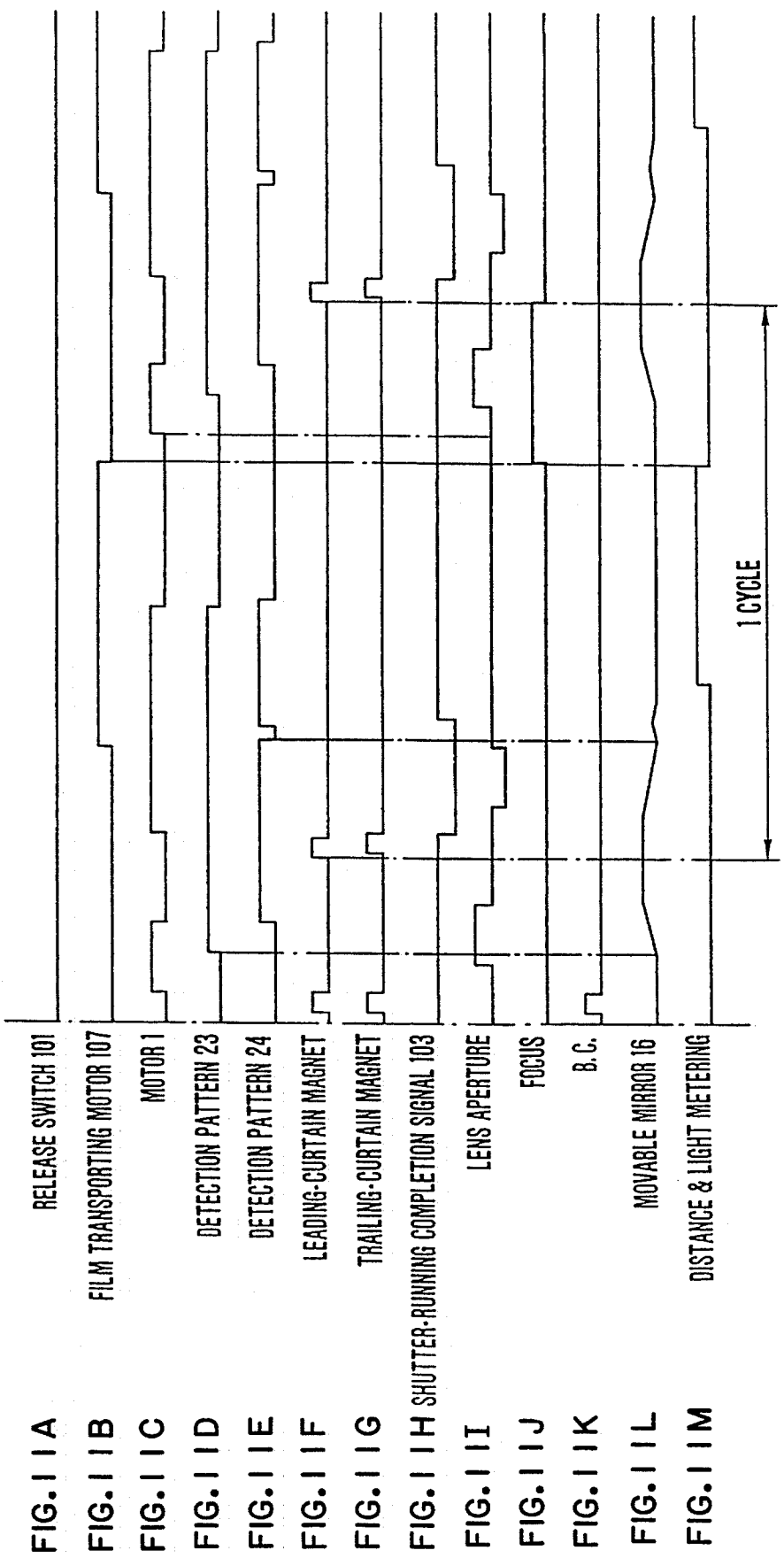

mirror-down position weakens. As a result, no strong
CAMERA WITH CAM-OPERATED MIRROR DRIVING MECHANISM This application is a division of Ser. No. 08/145,675 filed Nov. 4, 1993, now U.S. Pat. No. 5,408,290, which is a division of Ser. No. 07/886,318 filed May 22, 1992, now U.S. Pat. No. 5,311,229, which is a continuation of Ser. No. 07/650,866 filed Feb. 5, 1991, now abandoned.

BACKGROUND OF THE INVENTION

1. Field of the Invention

The present invention relates to a camera provided with a movable mirror.

2. Description of the Related Art

It is known that a conventional mirror driving mechanism for a single-reflex camera makes use of a method of rotating a movable mirror by utilizing the unidirectional operation of a motor, such as that disclosed in U.S. Pat. No. 4,864,336.

In this disclosed method, rotation of the movable mirror from an exposure-retracted position (hereinafter referred to as a "mirror-up position") to a finder-viewing position (hereinafter referred to as a "mirror-down position") is effected by means of a spring force, while rotation of the movable mirror from the mirror-down position to the mirror-up position is effected by means of the driving force of the motor.

However, it has been found that a camera having the above-described mirror driving mechanism involves a number of disadvantages.

One disadvantage is that, as the level of source voltage decreases with the consumption of a battery used as a power source, the number of revolutions of the motor which is driven for moving up the movable mirror is reduced and the time period required to move the movable mirror to the mirror-up position lengthens. The result is an increase in a release time lag.

Another disadvantage pertains to a moving-subject predictive autofocus mode which has recently been developed as one kind of autofocus mode, such as that disclosed in U.S. patent application Ser. No. 259,783 filed on Oct. 19, 1988, now abandoned. In such an autofocus mode, although a reduction in and the stabilization the release time lag are important considerations, the use of the conventional mirror driving mechanism cannot necessarily meet these and considerations.

Another disadvantage resides in the detection of the timing when the movable mirror reaches the mirror-down position. In the conventional mechanism, when a shutter charging operation is completed and energization of a shutter charging motor is stopped, a distance-metering operation is started. As a result, it is difficult to improve the frame speed at which continuous shooting is carried out while an autofocus operation is being performed. To cope with this disadvantage, the art of detecting through an exclusive detecting switch the completion of the mirror-down operation of the movable mirror through an exclusive detecting switch is known in Japanese Laid-Open Patent Application No. Sho 57-73725.

Another disadvantage is that, since a driving power for moving the movable mirror downward is obtained from the spring force, it is difficult to suppress the bounds of the movable mirror which occur when it reaches the mirror-down position.

More specifically, if the spring force is strengthened. A retaining force for retaining the movable mirror in the mirror-down position must be strong. However, the speed at which the movable mirror strikes a mirror stopper increases, with the result that bounds cannot be suppressed and impact noise increases.

If the spring force is weakened, the speed at which the movable mirror strikes the mirror stopper can be reduced, but the retaining force for retaining the movable mirror in the mirror-down position weakens. As a result, no strong force for suppressing bounds can be obtained and a long time will elapse until the bounds disappear.

SUMMARY OF THE INVENTION

It is an object of the present invention to provide a camera of the type in which a movable mirror is driven to move from a finder-viewing position toward an exposure-retracted position by means of a spring member, and in which, while a cam is being rotated in one direction by a motor serving as a drive source, the movable mirror can be driven from the finder-viewing position toward the exposure-retracted position by the urging force of the spring member and from the exposure-retracted position toward the finder-viewing position against the urging force of the spring member, merely by providing rotational control over the motor in response to the position of engagement between the cam and a cam follower.

It is another object of the present invention to provide a camera in which the timing when a distance-metering operation is to be initiated can be made earlier by providing a movable mirror arranged to be movable between a finder-viewing position and an exposure-retracted position a detecting means for detecting the arrival of the movable mirror at a distance-metering position.

The above and other objects, features and advantages of the present invention will become apparent from the following detailed description of a preferred embodiment of the present invention, taken in conjunction with the accompanying drawings.

BRIEF DESCRIPTION OF THE DRAWINGS

FIGS. 1 through 12(a), 12(b), 12(c) and 12(d) diagrammatically show one embodiment of the present invention;

FIG. 1 is a side elevational view of a mirror driving mechanism, showing a mirror-down state;

FIG. 2 is a side elevational view of a movable mirror in the mirror-down state;

FIG. 4 is a plan view of a detection pattern, showing the state of signal detection when the movable mirror rests in a mirror-down position;

FIG. 5 is a side elevational view showing the state in which the movable mirror rests in a mirror-up position;

FIG. 6 is a plan view showing the state of signal detection when the movable mirror rests in the mirror-up position;

FIG. 7 is a side elevational view showing the state of the movable mirror when a mirror-down operation is completed;

FIG. 8 is a plan view showing the state of signal detection when the mirror-down operation is completed;

FIG. 9 is a table showing the state of signal detection during the operation of the camera;

FIG. 10 is a block diagram showing a control circuit for use in the present embodiment;

FIGS. 11A through 11M are timing charts showing the operational sequence of the control circuit; and FIGS. 12(d), 12(b), 12(c) and 12(a) are flowcharts showing the operation of the control circuit.

DETAILED DESCRIPTION OF THE PREFERRED EMBODIMENT

A preferred embodiment of the present invention will be described below in detail with reference to the accompanying drawings.

Figure 1:
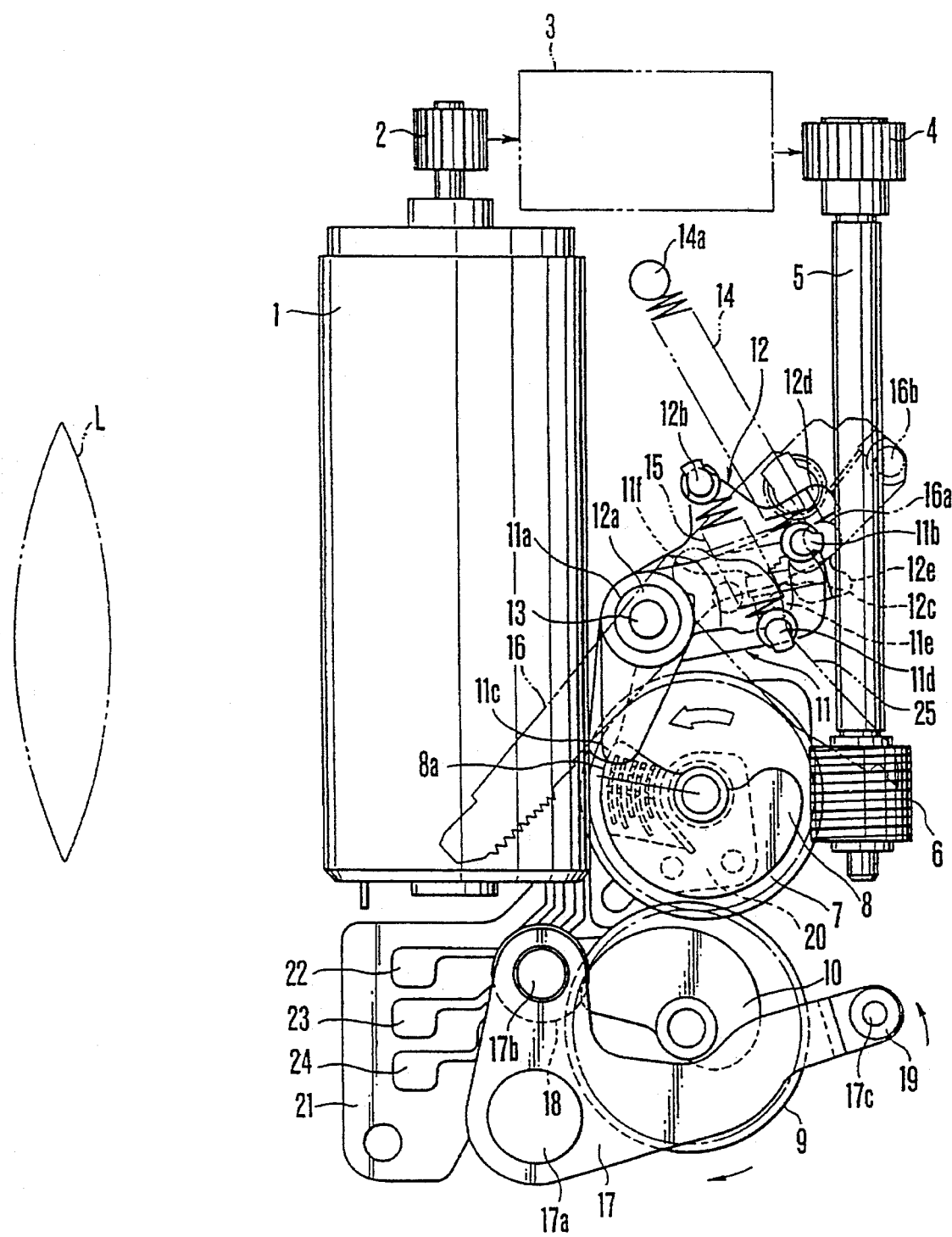

FIG. 1 is a schematic side elevational view showing one embodiment of a camera according to the present invention, and shows a mirror-down state (finder-viewing position). A photographic lens L is disposed on the middle left side of the drawing and, in the mirror-down state, subject light is, as viewed in FIG. 1, reflected upward from a movable mirror and conducted to a viewfinder optical system (not shown).

A movable mirror (main mirror) 16 is housed in a mirror box (not shown) and pivotal shafts 16b projecting from both sides of the movable mirror 16 are respectively supported for pivotal motion by bearing portions of the mirror box. The movable mirror 16 is pivotally movable about the pivotal shafts 16b between the shown mirror-down position and the mirror-up position (exposure-retracted position) shown in FIG. 5, and is selectively positioned at the mirror-down position or the mirror-up position by a corresponding stopper which will be described later. The movable mirror 16 is provided with a driving pin 16a to which is transmitted the driving power required to move up and down the movable mirror 16, and the driving pin 16a extends through a slot (not shown) formed in one side face of the mirror box. Pivotal motion of the movable mirror 16 is accomplished by a second lever 12 (to be described later) which is arranged to engage with the driving pin 16a.

Figure 2:
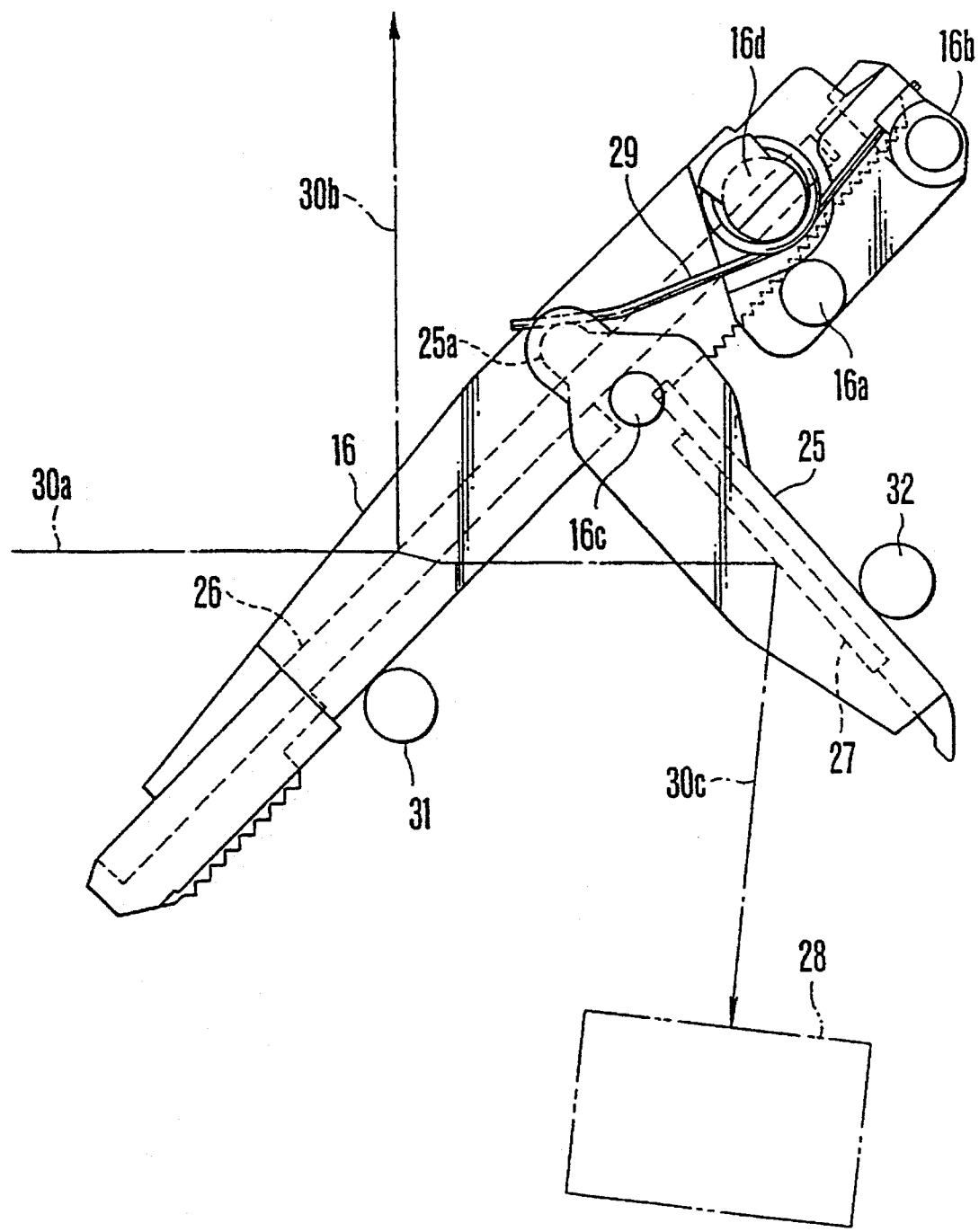

As shown in FIG. 2 on an enlarged scale, the movable mirror 16, when in the mirror-down state, is held in the mirror-down position in abutment with the stopper 31, and a distance-metering submirror 25, which is supported for pivotal motion about a pivotal shaft 16c on the back-face side of the movable mirror 16, is positioned in abutment with a stopper 32. The central light rays of subject light, which are conducted into the camera body through the photographic lens L along an optical axis 30a, are divided into two groups of light rays traveling along two different optical axes. One group of light rays is reflected by the movable mirror 16 and travels toward the viewfinder optical system along an optical axis 30b, while the other group of light rays is transmitted through a half-mirror portion 26 provided in the movable mirror 16 and travels along an optical axis 30c. The latter group of light rays, which passes through the half-mirror portion 26 and travels along the optical axis 30c, is totally reflected by a total reflection mirror 27 of the submirror 25 and conducted toward a distance-metering unit 28. The distance-metering unit 28 has a known construction with respect to which various proposals have been made, and a detailed description thereof is omitted.

The submirror 25 is pivotably urged by the spring force of a spring 29 which is supported by a spring hooking portion 16d of the movable mirror 16. The spring 29 is fixed to the movable mirror 16 at one end and is, at the other end, maintained in abutment with an operating portion 25a of the submirror 25, thereby constituting a toggle mechanism. In the toggle mechanism, when in the mirror-down position (a state in which focus detection is possible), the spring 29 urges the submirror 25 in the counterclockwise direction as viewed in FIG. 2 and, when in the mirror-up position, urges the submirror 25 in the clockwise direction into abutment with the back face of the movable mirror 16. To implement such a toggling operation, a cam member (not shown) is needed, but an illustration and description thereof is omitted since the mechanism is known. The stopper 31 for restricting the mirror-down position of the submirror 25 is made from a known adjustment mechanism utilizing, for example, an eccentric pin, so as to make fine adjustment of the mirror-down position of the submirror 25.

A mirror driving mechanism for driving the movable mirror 16 which is arranged in the above-described manner will be described below with reference to FIGS. 1 to 8.

The mirror driving mechanism includes a first lever 11 and a second lever 12 which are formed into the configurations shown in FIGS. 3(a), 3(b) and 3(c), 3(d), respectively. The axial opening of the second lever 12 is fitted onto a supporting shaft 13, formed on one side face of the mirror box, in such a manner that the second lever 12 is rotatable about the supporting shaft 13. An axial opening 11a of the first lever 11 is fitted onto a shaft portion 12a, which surrounds the aforesaid axial opening of the second lever 12, in such a manner that the first lever 11 is rotatable about the shaft portion 12a. In this arrangement, the length of engagement of both levers 11 and 12 is increased so that each of the first lever 11 and the second lever 12 can be pivotally supported with a minimum inclination due to a play. In addition, the first lever 11 and the second lever 12, which is positioned at a location between the first lever 11 and the movable mirror 16, are arranged pivotably with respect to each other. A pulling spring 15 is supported at one end by a spring hooking portion 11d of the first lever 11 and, at the other end, by a spring hooking portion 12b of the second lever 12. As viewed in FIG. 1, the pulling spring 15 urges the first lever 11 in the counterclockwise direction and the second lever 12 in the clockwise direction so that the first and second levers 11 and 12 are pulled toward each other. An abutment portion 11e of the first lever 11 and an abutment portion 12c of the second lever 12 are held in abutment with each other by the spring force of the pulling spring 15 so that the relative rotation between the first and second levers 11 and 12 is inhibited. The abutment portion 11e of the first lever 11 projects toward the second lever 12 which is positioned at a location between the first lever 11 and the movable mirror 16, and the abutment portion 12c of the second lever 12 is shaped in section to have a height which enables abutment with the abutment portion 11e. An inspection hole 11f is formed in the first lever 11 so that the state of abutment or non-abutment of the abutment portions 11e and 12c can be inspected. The inspection hole 11f is used for the purpose of overcharge inspection which will be described later.

A first arm portion 12d and a second arm portion 12e are formed at the end of the second lever 12 opposite to the shaft portion 12a so as to position the driving pin 16a of the movable mirror 16 between the portions 12d and 12e. When in the mirror-down position shown in FIG. 1, the first arm portion 12d is placed in abutment with the driving pin 16a to inhibit clockwise rotation of the movable mirror 16. During a mirror-up operation, as the second lever 12 rotates in the counterclockwise direction integrally with the first lever 11, the second arm portion 12e moves in abutment with the driving pin 16a, causing the movable mirror 16 to rotate in the clockwise direction from the mirror-down position to the mirror-up position. When the movable mirror 16 is placed in the mirror-up position, if the second lever 12 rotates in the clockwise direction, the first arm portion 12d moves in abutment with the driving pin 16a, causing the movable mirror 16 to rotate in the counterclockwise direction.

The counterclockwise rotating force of the second lever 12 for causing the movable mirror 16 to rotate from the mirror-down position to the mirror-up position, is produced by the spring force of a mirror-up spring 14 whose opposite ends are supported respectively by a spring hooking portion 11b of the first lever 11 and a spring hooking portion 14a provided on one side face of the mirror box. The clockwise rotating force of the second lever 12 for causing the movable mirror 16 to rotate from the mirror-up position to the mirror-down position while charging the mirror-up spring 14, as well as the operation of releasing the movable mirror 16 which is held at the mirror-down position in a charged state, is provided by the relation between a mirror driving cam 8 of a motor-driven type which will be described below and a cam abutment portion 11c of the first lever 11 which is maintained in abutment with the cam 8.

Referring to FIG. 1, a motor is indicated by reference numeral 1, and a gear 2 is fixed to the output shaft of the motor 1. A transmission mechanism 3 is disposed to transmit the output of the gear 2 to a gear 4. The transmission mechanism 3 may be constructed from, for example, a speed reduction gear train. Since it is possible to easily construct such a gear train by combining two speed gears, explanation of its construction is omitted. If a plurality of mechanisms are to be driven by a single motor to achieve a space saving, etc. in the camera body, the transmission mechanism 3 may be utilized as a mechanism for switching the direction of transmission of driving power in accordance with whether the direction of motor rotation is forward or reverse.

The gear 4, which is fixed to the top end of a transmission shaft 5 as viewed in FIG. 1, transmits the rotary motion of the motor 1 to the transmission shaft 5. A worm gear 6 is fixed to the bottom end of the transmission shaft 5. The worm gear 6 is meshed with a helical gear 7 having a rotary shaft supported by the mirror box, and as the motor 1 runs in a predetermined direction, the helical gear 7 rotates only in the counterclockwise direction indicated by the arrow shown on the same.

The mirror driving cam 8 having the shown configuration is fixed to the face of the helical gear 7 which is located on a side opposite to the movable mirror 16. The mirror driving cam 8 rotates in the same direction together with the helical gear 7.

When in the mirror-down state shown in FIG. 1, the operation of the motor 1 is stopped, and the cam abutment portion 11c of the first lever 11 is in abutment with a maximum-diameter portion 8a of the mirror driving cam 8, the maximum-diameter portion 8a being shaped into a predetermined rounded form. Accordingly, the first lever 11 is inhibited from rotating in the counterclockwise direction by the urging force of the mirror-up spring 14. As described above, the first lever 11 and the second lever 12 integrally rotate in a state wherein they are pulled toward each other up to a predetermined phase angle by the pulling spring 15. The first arm portion 12d of the second lever 12 is brought into abutment with the driving pin 16a so as to position the movable mirror 16 in the mirror-down position immediately before the cam abutment portion 11c comes into abutment with the maximum-diameter portion 8a of the mirror driving cam 8. The first lever 11 rotates against the spring force of the pulling spring 15 in the clockwise direction to a slight extent while overcharging the mirror-up spring 14 until the cam abutment portion 11c reaches the maximum-diameter portion 8a. The second lever 12 is subjected to the spring force of the pulling spring 15 to elastically press the movable mirror 16 against the mirror-down position. This overcharged state can be inspected through the inspection hole 11f formed in the first lever 11. If a predetermined gap is established between the abutment portions 11e and 12c of the levers 11 and 12, it is determined that an effective overcharged state has been achieved. If the abutment portions 11e and 12c are in contact with each other or spaced apart beyond the predetermined gap, an adjustment is performed to obtain the predetermined gap.

The helical gear 7 is meshed with a shutter-charging helical gear 9 to cause it to rotate in the clockwise direction indicated by the shown arrow, thereby charging a shutter (not shown) in synchronization with the driving of the movable mirror 16. A shutter charging cam 10 is fixed to the helical gear 9. A shutter charging lever 17 is arranged for pivotal motion about a pivotal shaft 17a, and a roller 18 is provided at one end of the shutter charging lever 17 and is supported for rotation about a support shaft 17b. The roller 18 is in abutment with the cam surface of the shutter charging cam 10. A roller 19, which is rotatably supported by a support shaft 17c provided at the other end of the shutter charging lever 17, is in abutment with a charge lever provided on the side of the shutter (not shown). The shutter charging lever 17 is arranged to charge the shutter (not shown) while rotating in the counterclockwise direction. In FIG. 1, the shutter charging lever 17 is shown as holding the shutter in a completely charged state.

A position detecting mechanism for detecting the position of the mirror driving cam 8 is disposed on the reverse face of the helical gear 7 in coaxial relation thereto. This mechanism is formed by a contact piece 20 secured to the helical gear 7 and a board 21 having one surface provided with detection patterns 22, 23 and 24 which are arranged for contact with the contact piece 20.

Figure 4:
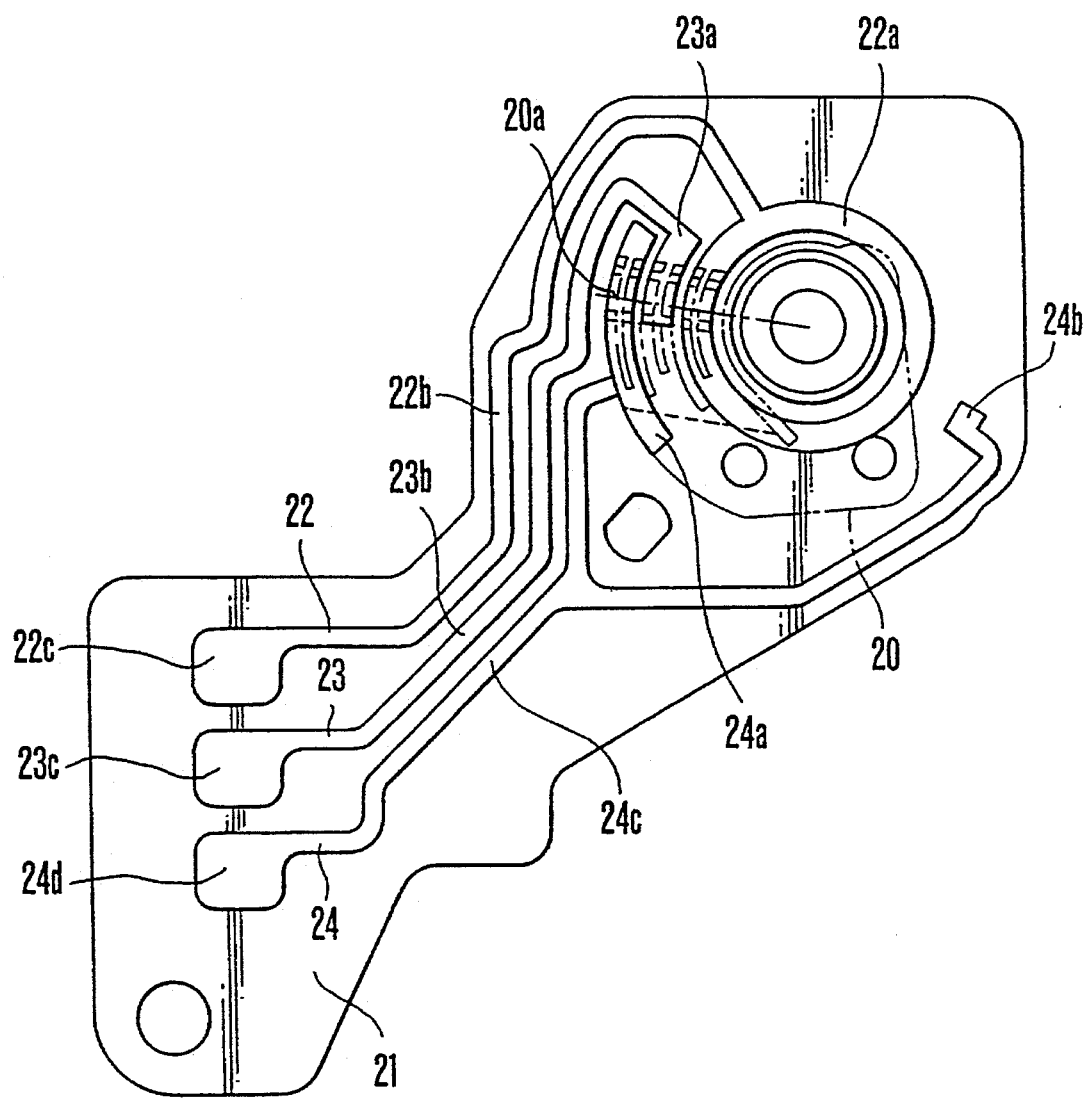

FIG. 4 is an enlarged plan view of the board 21. The detection pattern 22 is supplied with a ground potential through an input portion 22c, and the ground potential is supplied to a signal pattern portion 22a through a connection portion 22b. The detection pattern 23 includes a signal pattern portion 23a, a connection portion 23b and an output portion 23c, and the detection pattern 24 includes signal pattern portions 24a and 24b, a connection portion 24c and an output portion 24d. When in the mirror-down position, the contact piece 20 is brought into contact with the signal pattern portions 22a, 23a and 24a which are concentrically spaced apart along a straight solid line representing a contact line 20a, whereby it is determined whether the ground potential supplied from the detection pattern 22 is transmitted to the detection patterns 23 and 24. In the following explanation, it is assumed that when the detection patterns 23 and 24 come into contact with the detection pattern 22, each of the detection patterns 23 and 24 is set to a low (Lo) level; if not in contact with the detection pattern 22, each of the detection patterns 23 and 24 is set to a high (Hi) level. Accordingly, if the signal pattern portions 22a, 23a and 24a are electrically connected as shown in FIG. 4 (corresponding to FIG. 1) and each of the detection patterns 23 and 24 is at the low level, it is detected that the movable mirror 16 is placed in the mirror-down position.

Figure 3A:
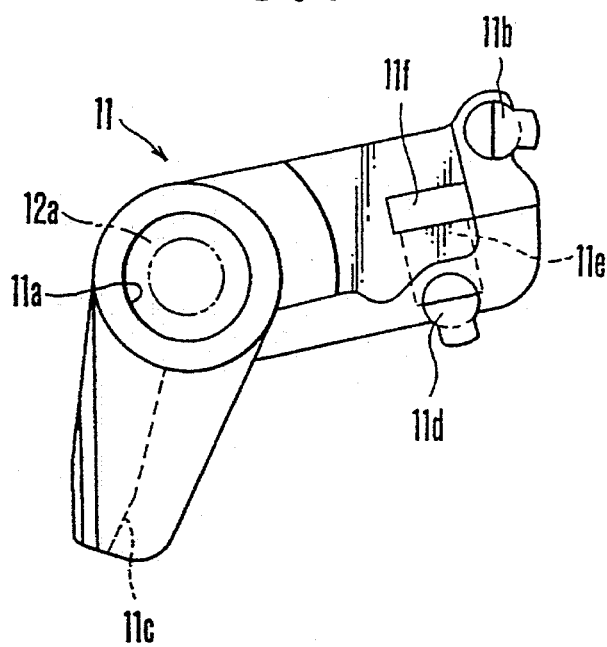
FIGS. 3(a) and 3(b) are a plan view and a cross-sectional view of a first lever, respectively.
Figure 3B:
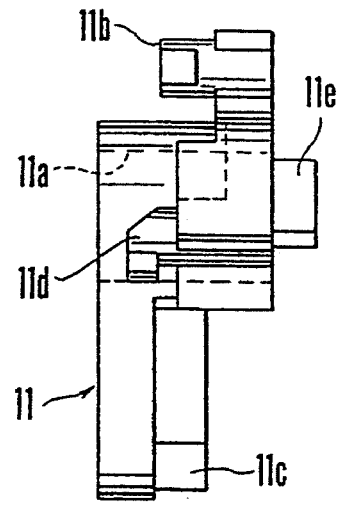
Figure 3C:
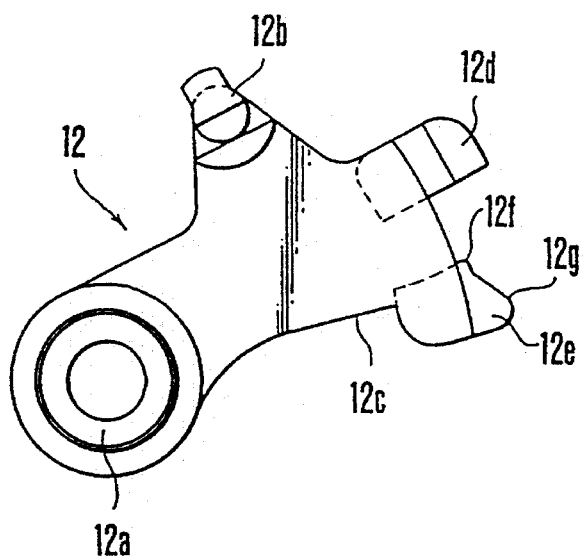
FIGS. 3(c) and 3(d) are a plan view and a cross-sectional view of a second lever, respectively.
Figure 3D:
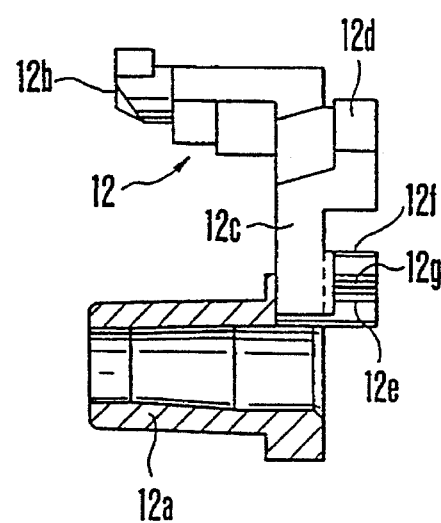
Figure 5:
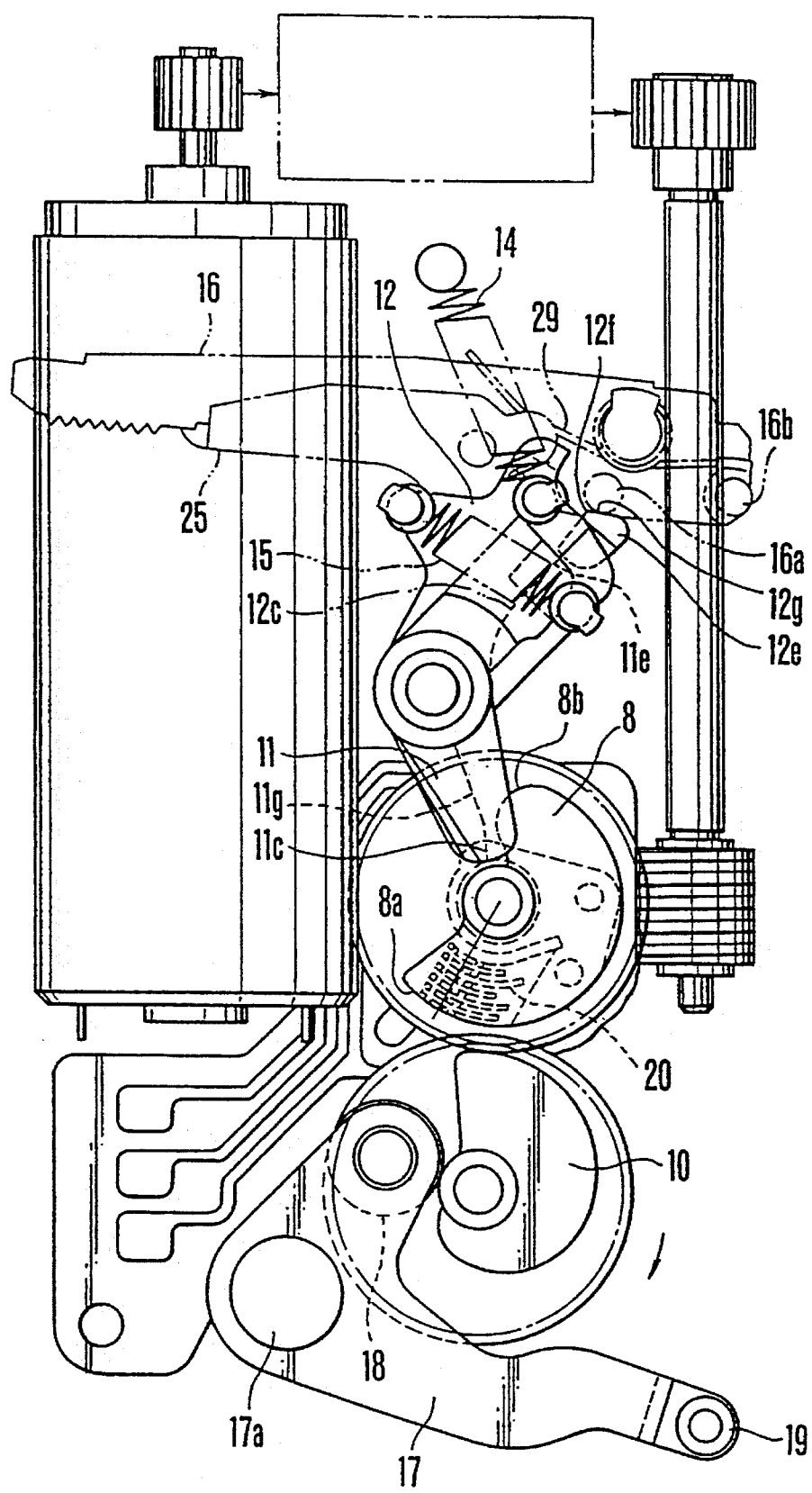

When in the mirror-down position shown in FIG. 1, counterclockwise rotation of the first lever 11 is inhibited owing to the abutment between the maximum-diameter portion 8a and the cam abutment portion 11c. In this state, the helical gear 7 initiates rotation. When the helical gear 7 rotates by a small amount, the cam abutment portion 11c of the first lever 11 and the mirror driving cam 8 come out of abutment with each other, that is to say, the first lever 11 is allowed to freely rotate. Accordingly, the first lever 11 is rotated in the counterclockwise direction by the spring force of the mirror-up spring 14 which is in a charged state. At this time, since the first lever 11 and the second lever 12 are pulled toward each other by the pulling spring 15 and the abutment portions 11e and 12c are in abutment with each other, the first lever 11 and the second lever 12 integrally rotate in the counterclockwise direction. Accordingly, the second arm portion 12e of the second lever 12 comes into abutment with the driving pin 16a of the movable mirror 16 to cause the movable mirror 16 to rotate in the clockwise direction so as to rotate the movable mirror 16 from the mirror-down position to the mirror-up position. As shown in FIGS. 3(c), 3(d) and 5, a first cam surface 12f and a second cam surface 12g are formed on the surface of the second arm portion 12e which is brought into and out of abutment with the driving pin 16a. when the second lever 12 in the mirror-down state initiates counterclockwise rotation, the first cam surface 12f having a projection-like configuration initially comes into abutment with the driving pin 16a to rotate the movable mirror 16 in the clockwise direction. When the second lever 12 further rotates and reaches the vicinity of the mirror-up position, the point of abutment with the driving pin 16a travels from the first cam surface 12f to the second cam surface 12g. Immediately thereafter, when the movable mirror 16 comes into abutment with a stopper (not shown), the mirror-up operation is completed. The second cam surface 12g has an angle which serves to increase a retaining force for retaining the movable mirror 16 in the mirror-up state, thereby preventing the movable mirror 16 from bounding at the mirror-up position when it has been moved there by the urging force of the mirror-up spring 14. Even in a case where it is impossible to completely prevent the movable mirror 16 from bounding merely by the retaining force produced by the second cam surface 12g, the first cam surface 12f acts to stop the movable mirror 16 with a minimum number of bounds, whereby it is possible to stabilize the movable mirror 16 at the mirror-up state within a short time.

When in the mirror-up state, the submirror 25 also rotates in the counterclockwise direction (in a closing direction with respect to the movable mirror 16) by the above-described mechanism and, as shown in FIG. 5, comes into abutment with the back face of the movable mirror 16 by the action of the spring 29.

After the aforesaid movable mirror 16 is released from retention, the motor 1 remains running and the helical gear 7 continues to rotate in a predetermined direction. However, when the state shown in FIG. 5 is reached and the mirror-up operation is completed, the motor 1 and the helical gear 7 come to a temporary rest.

Referring to a shutter charging operation, since the roller 18 is disengaged from the maximum-diameter portion of the shutter charging cam 10, the shutter charging lever 17 is allowed to rotate in the clockwise direction, while the roller 19 operates to release the shutter charging lever of the shutter (not shown) from its charged state. In the above-described state, the shutter (not shown) is ready to initiate an exposure operation.

Figure 6:
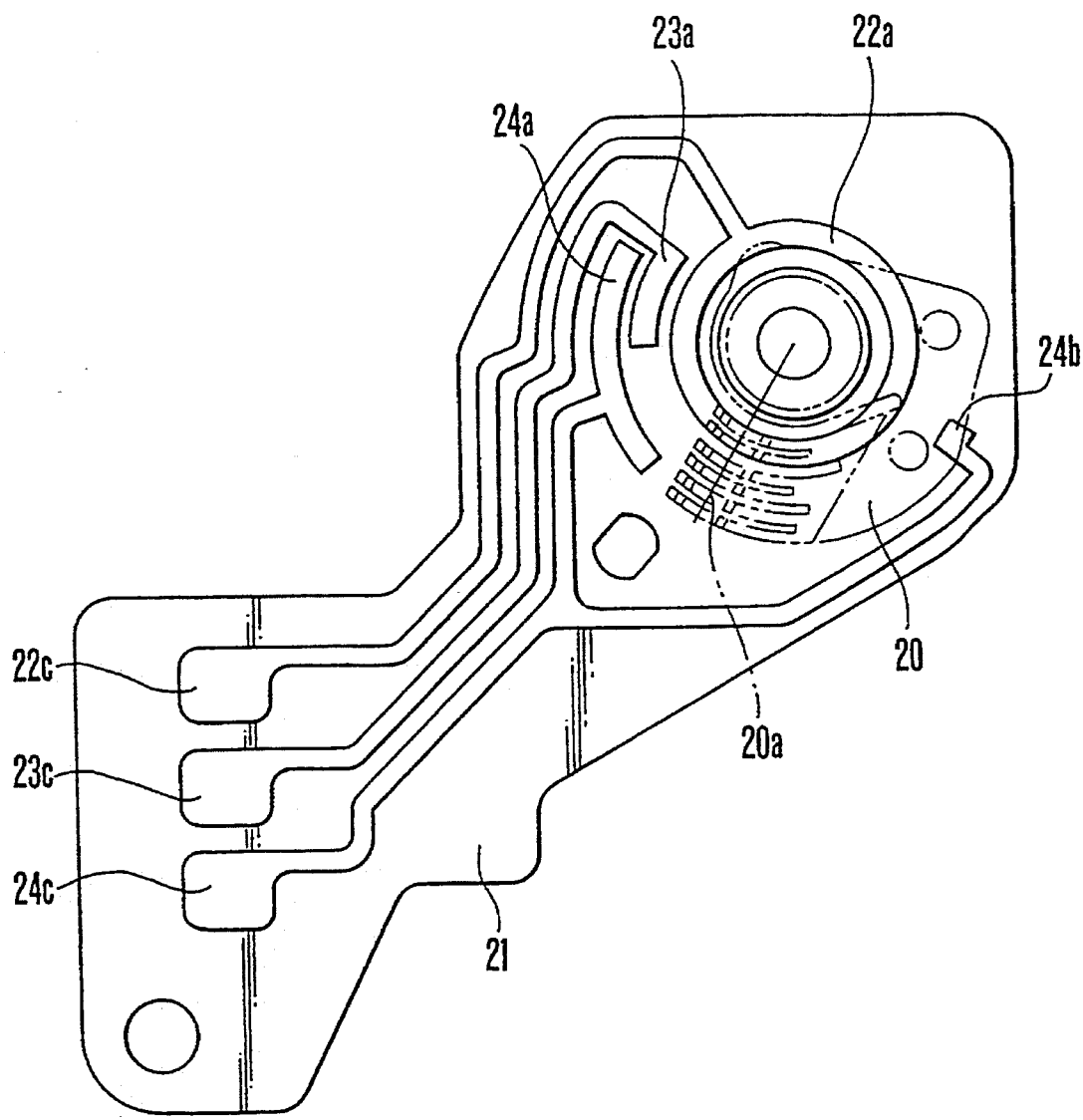

When the mirror-up operation is completed and the movable mirror 16 rests in the mirror-up position, the position detecting mechanism for the mirror driving cam 8 is placed in the signal detection state shown in FIG. 6.

As shown, the contact piece 20 makes contact with only the signal pattern 22a on the contact line 20a. Accordingly, the detection patterns 23 and 24 are both at the high levels.

Figure 7:
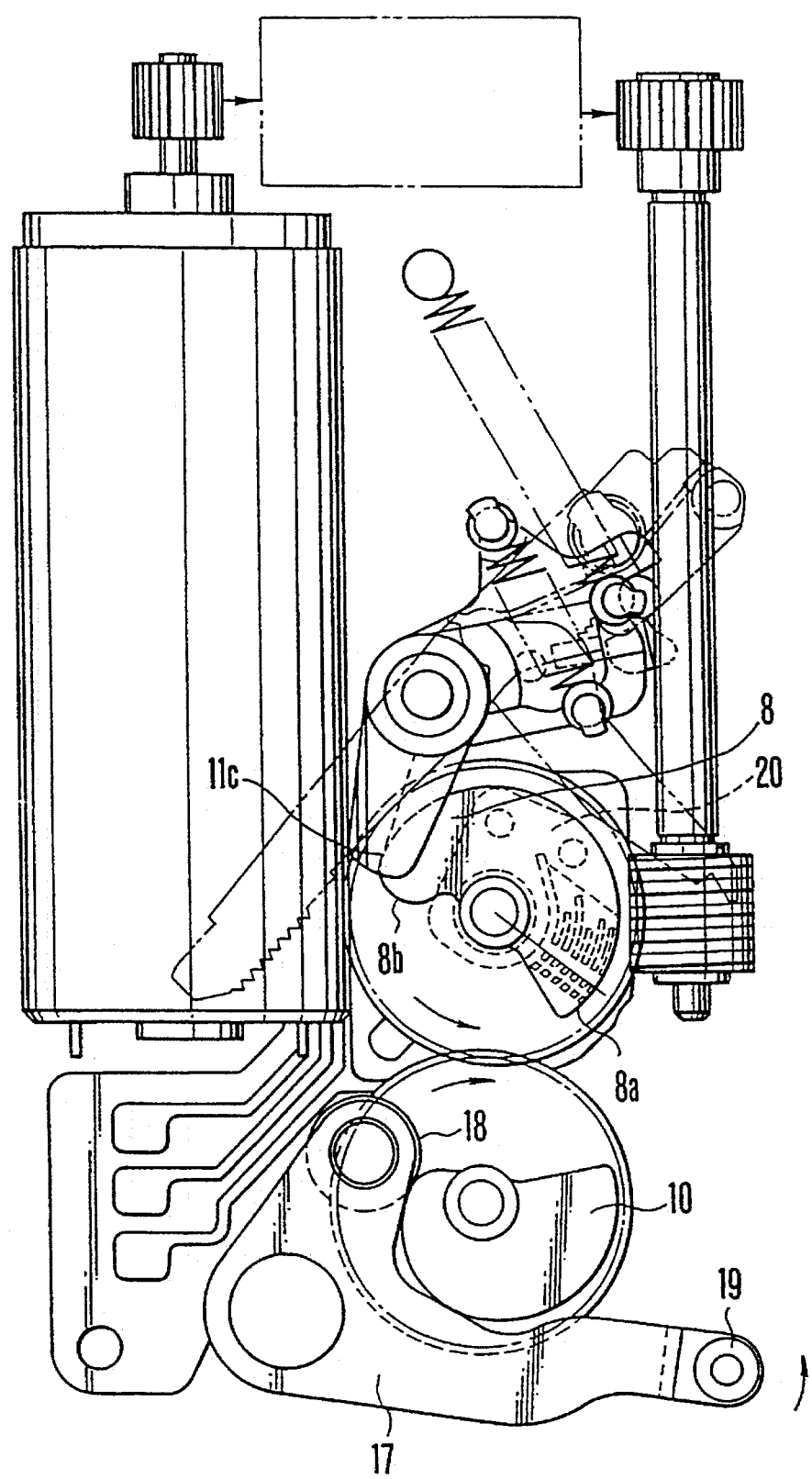

FIG. 7 is a view showing the state of completion of a mirror-down operation during a shutter charging operation.

In an initial period of the mirror-down operation, the cam abutment portion 11c of the first lever 11 comes into abutment with a cam portion 8b of the mirror driving cam 8, thereby causing the first lever 11 and the second lever 12 to rotate together in the clockwise direction. The first arm portion 12d of the second lever 12 comes into abutment with the driving pin 16a of the movable mirror 16, thereby causing the movable mirror 16 to rotate in the counterclockwise direction. When the motor 1 further runs, the cam abutment portion 11c of the first lever 11 comes into abutment with the cam portion 8b of the mirror driving cam 8 to cause the movable mirror 16 to rotate in the counterclockwise direction to the mirror-down position where the movable mirror 16 is brought into abutment with the stopper 31. FIG. 7 shows this mirror-down state. In this state, the cam abutment portion 11c of the first lever 11 is not in abutment with the maximum-diameter portion 8a of the mirror driving cam 8. The motor 1 further runs to cause the first lever 11 to rotate in the clockwise direction until the above-described overcharged state is reached. When the overcharged state is reached, the cam abutment portion 11c of the first lever 11 is, as shown in FIG. 1, brought into abutment with the maximum-diameter portion 8a of the mirror driving cam 8, and the operation of the motor 1 is stopped. A description will be given later as to the state of energization of the motor 1 before the cam abutment portion 11c of the first lever 11 comes into abutment with the maximum-diameter portion 8a of the mirror driving cam 8.

Immediately after the movable mirror 16 has reached the mirror-down position, the movable mirror 16 might bound by striking the stopper 31. However, since the first lever 11 is rotated to the overcharged position against the spring force of the pulling spring 15, the second lever 12 in engagement with the driving pin 16a of the movable mirror 16 suppresses the bounds of the movable mirror 16 owing to the spring force of the pulling spring 15. Accordingly, the movable mirror 16 settles at the mirror-down position within a short time.

Meanwhile, in the shutter charging system, the shutter charging cam 10 and the roller 18 comes into abutment with each other, so that the shutter charging lever 17 initiates rotating in the counterclockwise direction. Basically, a mirror-down operation precedes a shutter charging operation. However, as shown in FIG. 7, a plurality of driving loads are overlapped so as to maintain an approximately uniform load within a range in which a maximum load does not increase.

Figure 8:
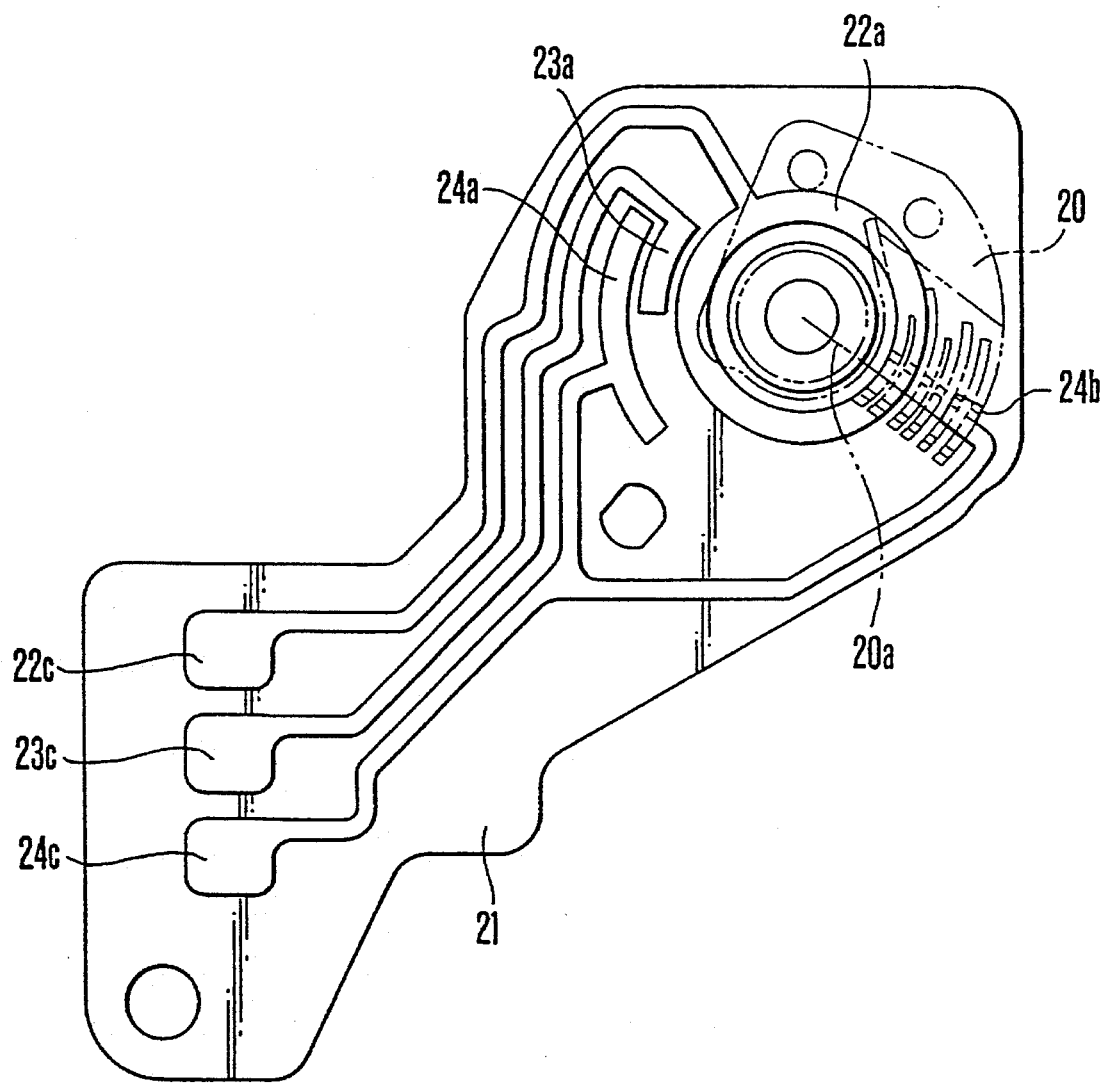
Figure 12A:
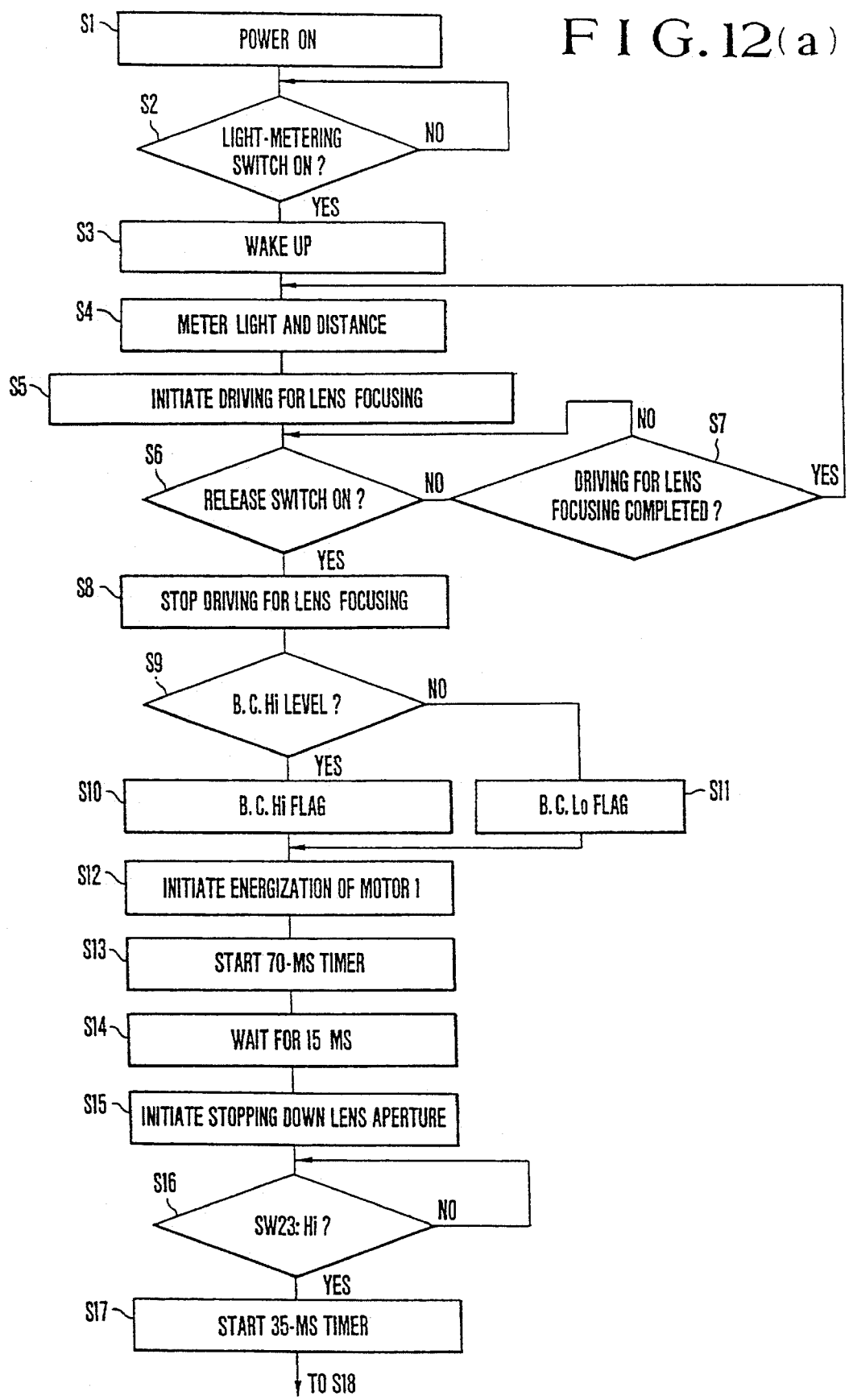
Figure 12B:
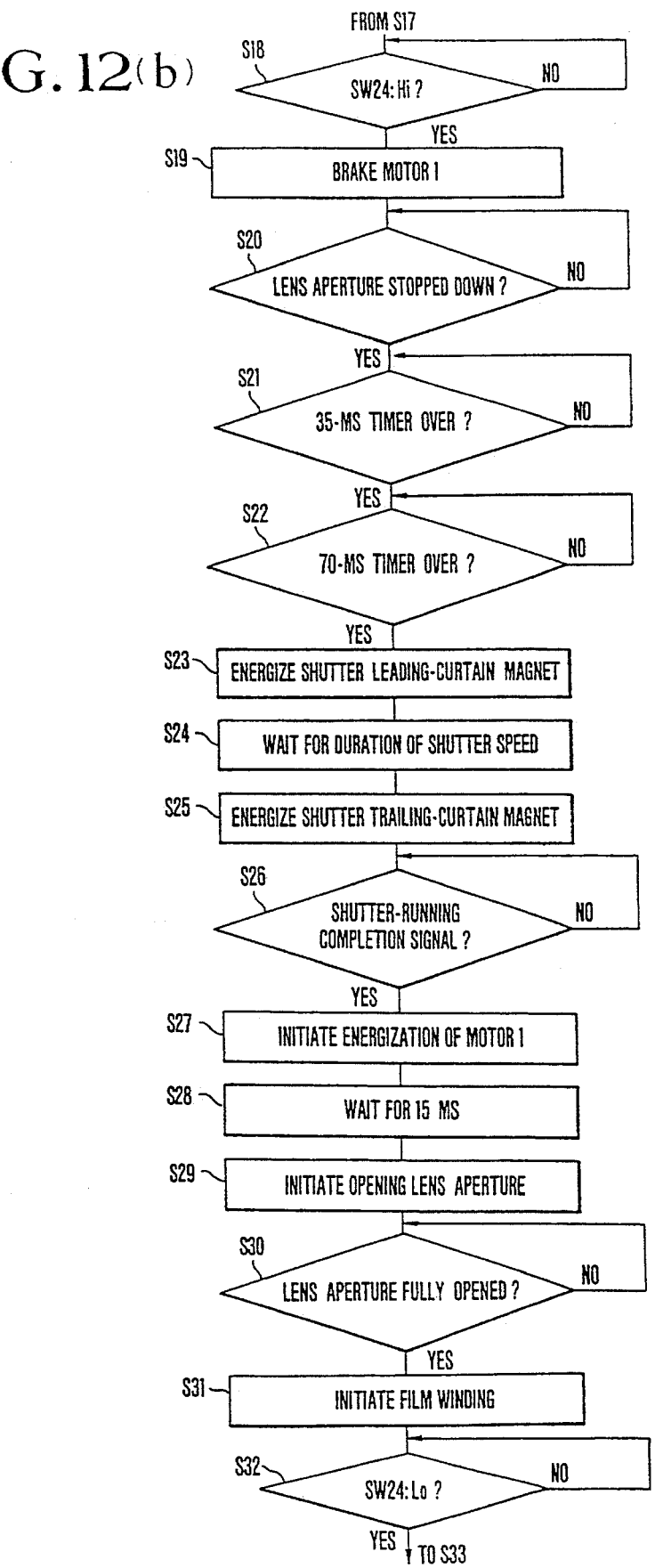
Figure 12C:
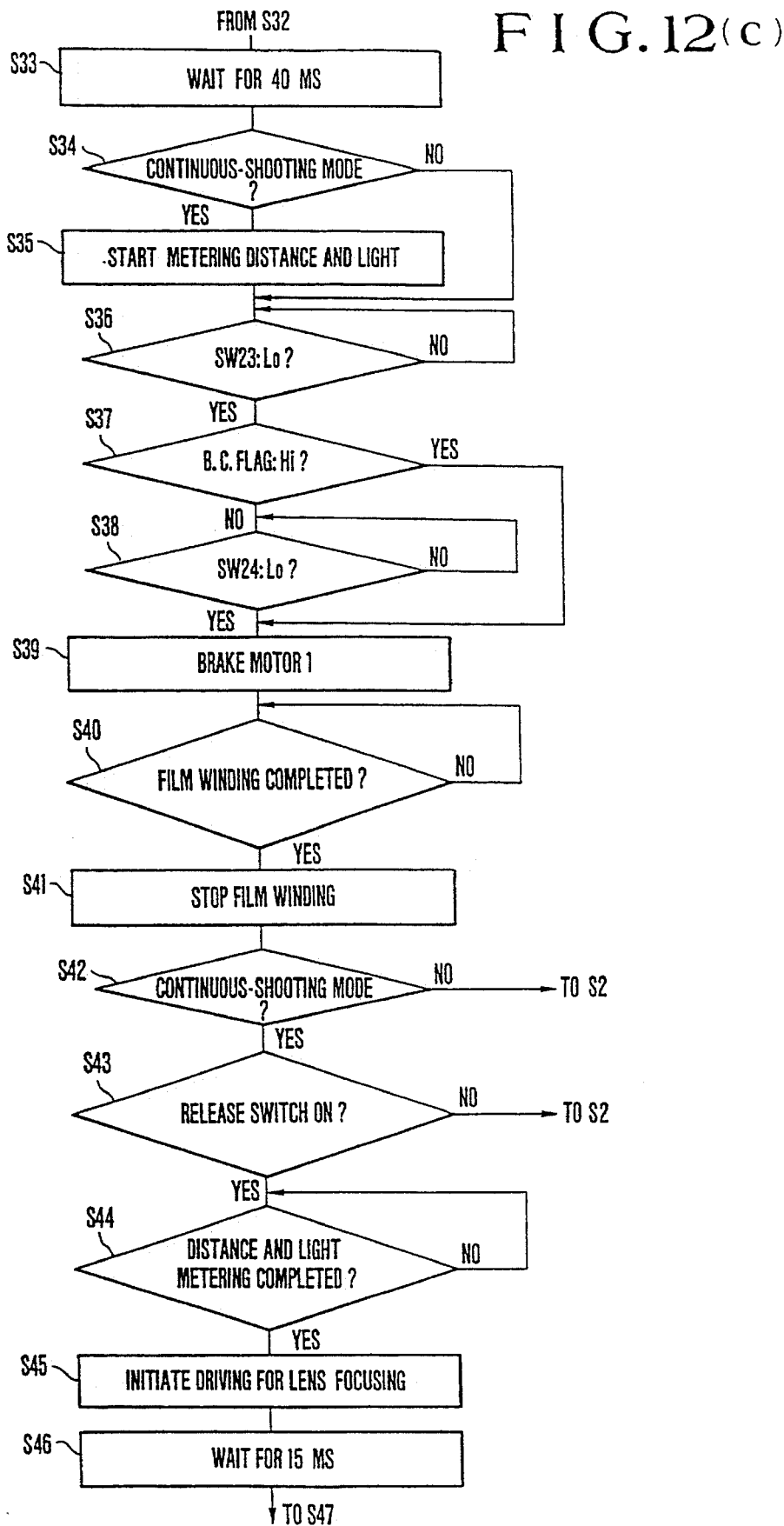
Figure 12D:
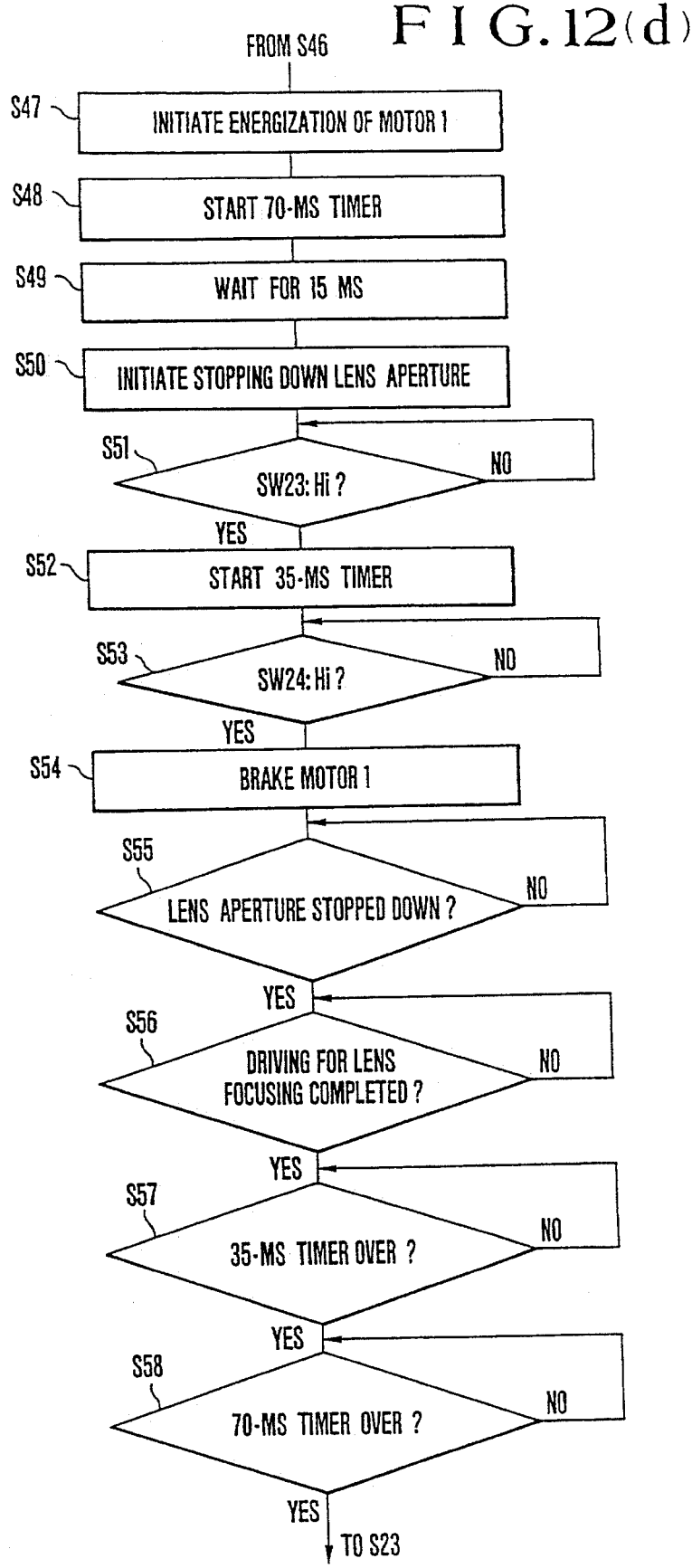

FIG. 8 shows the state of signal detection which is carried out by the position detecting mechanism for the mirror driving cam 8 upon completion of a mirror-down operation. The signal pattern portions 22a and 24b are in contact with the contact line 20a of the contact piece 20, and the detection pattern 23 is at the high level, while the detection pattern 24 is at the low level.

FIG. 9 is a table showing the signal detection state of the detection patterns 23 and 24 in each step of one rotation of the mirror driving cam 8.

In a state wherein a shutter charging operation is completed and the operation of the mechanism is stopped as shown in FIGS. 1 and 4, each of the detection patterns 23 and 24 is at the low level as described above. In this state, energization of the motor 1 is initiated, and the detection pattern 23 is switched from the low level to the high level in the phase where the cam abutment portion 11c of the first lever 11 is released from the maximum-diameter portion 8a of the mirror driving cam 8. In this phase, the movable mirror 16 starts to move up by virtue of the mirror-up spring 14 and stabilizes at the mirror-up position in a predetermined time. In other words, by setting a predetermined timer at the timing when the detection pattern 23 is switched from the low level to the high level, it is possible to detect the timing of stabilization of the movable mirror 16 at the mirror-up position, irrespective of the state of an electrical power source.

During the above-described operation, the energization of the motor 1 is continued, and the detection pattern 24 is switched from the low level to the high level in the phase where the roller 18 of the shutter charging system is released from the state of being restricted by the shutter charging cam 10. At this point in time, the energization of the motor 1 is stopped and the motor 1 is braked by short-circuiting its terminals, whereby each mechanism comes to rest in the state shown in FIG. 5.

After completion of the exposure operation, when energization of the motor 1 is initiated and the state shown in FIG. 7 is reached, the signal of the detection pattern 24 is switched from the high level to the low level. According to this signal, it is possible to accurately detect the timing when the movable mirror 16 and the submirror 25 reach the mirror-down position, irrespective of the state of the electrical power source. In addition, by setting a predetermined timer on the basis of such timing, it is possible to accurately detect the timing when the movable mirror 16 and the submirror 25 stabilize. Although, during the energization of the motor 1, the detection pattern 24 switches from the low level to the high level, the energization of the motor 1 is continued. When the roller 18 reaches the maximum-diameter portion of the shutter charging cam 10, the detection pattern 23 switches from the high level to the low level by means of the signal pattern portion 23a. When the shutter charging cam 10 further rotates by a predetermined angle, the detection pattern 24 switches from the high level to the low level by means of the signal pattern portion 24a. The above-described signal-level change is utilized so that the timing when the energization of the motor 1 is stopped and its terminals are short-circuited to brake the motor 1 to bring the mirror driving cam 8 to rest in the state of FIG. 1 can be set as two different times: an earlier time and a later time.

If the source voltage is high, the speed of revolution of the motor 1 is fast and the amount of overrunning of the mirror driving cam 8 after braking is large. For this reason, the motor 1 is braked at an earlier time during the process of the signal-level change of the detection pattern 23 from the high level to the low level, thereby bringing the mirror driving cam 8 to rest at the predetermined position shown in FIG. 1.

If the source voltage is low, the speed of revolution off the motor 1 is slow and the amount of overrunning of the mirror driving cam 8 after braking is small. For this reason, the motor 1 is braked at a later time during the process of the signal-level change of the detection pattern 23 from the high level to the low level, thereby bringing the mirror driving cam 8 to rest at the predetermined position shown in FIG. 1.

Although, in the presently preferred embodiment, switching between the braking timings is performed at two different times only, it is a matter of course that if such switching is performed at shorter intervals, a more accurate stop phase can be obtained. Accordingly, the time period from the moment for initiating energization of the motor 1 until the moment for initiating a mirror-up operation can be kept shorter and stabler for variations in the source voltage.

As described above, with the present embodiment, it is possible to realize a reduction in and the stabilization of a release time lag and also an arrangement which makes it possible to accurately detect the timing of stabilization of the movable mirror 16 at the mirror-up position. Accordingly, the present embodiment is advantageous for increasing the frame speed of continuous shooting in a flying release system such as that disclosed in U.S. Pat. No. 4,679,925.

FIG. 10 is a block diagram showing one example of the control circuit used in the presently preferred embodiment.

The shown control circuit is provided with a light-metering switch 100 which is turned on at the first stroke of a release button (not shown), and a release switch 101 which is turned on at the second stroke of the release button. Signals from the switches 100 and 101 are inputted to a microprocessor (MPU) 102. The MPU 102 also receives a shutter-running completion signal 103 from a means for detecting the completion of running of the shutter trailing curtain, signals from the detection patterns 23 and 24 for controlling energization of the motor 1, and a film advance signal 104 from a film advance detecting means (not shown). A light-metering circuit 105 and a distance-metering circuit 106 are supplied with operational-timing information by the MPU 102, and transmit individual outputs to the MPU 102. The motor 1 and a film transporting motor 107 are driven by signals supplied from the MPU 102 through motor drivers 108 and 109, respectively. The motor drivers 108 and 109 have bridge circuits which can switch the states of the respective motors 1 and 107 between a forward or reverse energized state and an electrically braked state utilizing a short circuit. When the shutter is to be activated, a shutter leading-curtain magnet 110 is energized in response to a signal from the MPU 102 to start running of a leading curtain. After the duration of a predetermined shutter speed has passed, a shutter trailing-curtain magnet 111 is energized in response to a signal from the MPU 101 to start running of a trailing curtain. An interface for connecting a photographic lens and a camera body, neither of which is shown, is realized not by a mechanical coupling but by electrical communication between the MPU 102 of the camera body and a lens controlling circuit 112. Electrical power for driving the photographic lens is supplied from the camera body.

The photographic lens includes a diaphragm driving actuator 113 and a focus driving actuator 114. The diaphragm driving actuator 113 and the focus driving actuator 114 are driven by means of a lens controlling circuit 112 in response to driving timings specified by the MPU 102.

The control circuit having the above-described arrangement and construction operates in accordance with the timing charts shown in FIGS. 11A through 11M.

These timing charts illustrates the state in which the release switch 101 is turned on at the second stroke and connected in the on state, with the light-metering switch 100 relative to the first stroke of the release button (not shown) remaining in the on state. A continuous-shooting mode and a single-shooting mode can be selectively set as a film transporting mode by a mode setting means (not shown), and the timing charts show a state corresponding to the setting of the continuous-shooting mode. A battery check is accomplished by checking an actual load while electricity is being supplied to the leading-curtain magnet 110 and the trailing-curtain magnet 111 of the shutter. In the timing charts, there is shown a state in which the movable mirror 16 changes its state while moving up and down. The timing charts also show a state in which continuous shooting is effected by performing autofocus while predicting the movement of a moving subject.

The operation of the present preferred embodiment of the camera will be described below with reference to the timing charts of FIGS. 11A through 11M as well as the flowcharts shown in FIGS. 12(a) to 12(d).

When a power switch (not shown) is turned on (Step S1) and the light-metering switch 100 is turned on (Step S2), a wake-up operation is performed (Step S3) to activate a DC/DC converter (not shown), thereby activating individual circuits.

Then, the light-metering circuit 105 and the distance-metering circuit 106 are activated (Step S4), and the focus driving actuator 114 of the photographic lens is activated on the basis of the information provided by the light-metering circuit 105 and the distance-metering circuit 106, thereby initiating driving for lens focusing (Step S5). The manner of distance metering and driving for lens focusing in the embodiment is similar to that disclosed in detail in U.S. patent application Ser. No. 259,783 filed on Oct. 19, 1988 (abandoned in favor of Ser. No. 519,251 now U.S. Pat. No. 5,012,267, i.e., driving for lens focusing is performed while predicting the movement of a moving subject. Explanation thereof is omitted for the sake of simplicity.

If it is determined in Step S6 that the release switch 101 is not on, the process proceeds to Step S7, where a predetermined amount of driving for lens focusing is performed. Then, the process returns to Step S4, where a light•distance-metering operation is performed. If the release switch is turned on during this time, the driving for lens focusing is stopped (Step S8) and the process enters a photographic sequence.

In the present preferred embodiment, driving for lens focusing is stopped halfway in order to mainly cope with a release time lag which may occur after the release switch 101 has been turned on. However, after a predetermined amount of lens driving has been performed, the process may be allowed to enter the photographic sequence. Otherwise, the process may be inhibited from proceeding to the photographic sequence on the basis of the state of a distance-metering operation.

In Step S9, a battery check is performed. If the battery voltage is higher than a predetermined voltage, a BCHi flag is set up (Step S10). If the battery voltage is lower than the predetermined voltage, a BCLo flag is set up (Step S11).

In Step S12, energization of the motor 1 is initiated. At the same time, a release-time-lag stabilizing 70-ms timer for maintaining a constant release time is started (Step S13). The interval of this timer is set on the basis of the maximum period required for lens-diaphragm driving whose period varies with an aperture value. In addition, the interval is selected to be the duration it takes for the movable mirror 16 to complete its mirror-up operation. Accordingly, it is possible to keep constant a release time lag which may occur during the execution of the above noted and moving-subject predictive autofocus, whereby prediction accuracy is improved.

To prevent a rush current from occurring at the mime of activation of the motor 1, when a time delay of 15 milliseconds passes (Step 14), the operation of stopping down a lens aperture is started (Step S15).

If the detection pattern 23 for detecting the phase of the mirror driving cam 8 switches to its high level in Step S16, a mirror-up-state assurance 35-ms timer is started (Step S17). The timing at which the detection pattern 23 switches to the high level corresponds to the phase where the movable mirror 16 starts to move up.

The energization of the motor 1 is continued, and when the signal of the detection pattern 24 switches to its high level, the energization of the motor 1 is stopped (Step S18) and electrical braking is applied to be motor 1 (Step).

If the lens aperture is stopped down (Step S20), when the conditions of the mirror-up-state assurance 35-ms timer and the release-time-lag stabilizing 70-ms timer are satisfied (Steps S21 and S22), energization of the shutter leading-curtain magnet 110 is performed (Step S23). When the duration of a predetermined shutter speed has passed (Step S24), energization of the shutter trailing-curtain magnet 111 is performed (Step S25) to cause the shutter leading and trailing curtains to run, thereby effecting an exposure operation.

When a shutter-running completion signal is inputted in Step S26, energization of the motor 1 is started (Step S27). When a time delay of 15 milliseconds passes Step S28), the operation of opening the lens aperture is initiated (Step S29).

When the operation of opening the lens aperture is completed in Step S30, energization of the film transporting motor 107 is initiated to start film winding (Step S31).

When the signal of the detection pattern 24 switches to its low level in Step S32, a mirror-down-position stabilizing 40-ms timer is started (Step S33). This timer serves to ensure that small vibrations remaining after the movable mirror 16 and the submirror 25 have reached the mirror-down position are stopped.

If the continuous-shooting mode is selected (Step S34), distance- and light-metering operations are initiated (Step S35). If the single-shooting mode is selected, the process proceeds to Step S36.

If the BC flag memorized in Step S10 or S11 is at the high level when the detection pattern 23 has switched to the low level (Step S36), electrical braking is immediately applied to the motor 1 (Step S39). If the BC flag memorized in Step S10 or S11 is at the low level when the detection pattern 23 has switched to the low level (Step S36), after the detection pattern 24 has switched to the low level (Step S38), electrical braking is applied to the motor 1 (Step S39).

When the completion of film winding is detected in response to a film winding signal in Step S40, the energization of the film transporting motor 107 is stopped and electrical braking is applied to the motor 107 (Step S41).

If the continuous-shooting mode is selected in Step 42, the process proceeds to Step S43. If the release switch 101 is on in Step S43, the process proceeds to Step S44; if it is off, the process returns to Step S2.

If it is determined in Step S44 that the distance- and light-metering operations have been completed, driving for lens focusing is initiated (Step S45). After a time delay of 15 milliseconds has passed (Step 47), energization of the motor 1 is initiated (Step S47) and the release-time-lag stabilizing 70-ms timer is started (Step S48).

Then, when a time delay of 15 milliseconds passes (Step 49), the operation of stopping down the lens aperture is started (Step S50).

When the signal of the detection pattern 23 switches to the high level (Step S51), the mirror-up-state assurance 35-ms timer is started (Step S52). When the signal of the detection pattern 24 switches to the high level (Step S53), the energization of the motor 1 is stopped and electrical braking is applied to the motor 1 (Step S54).

When the operation of stopping down the lens aperture is completed (Step S55), the process proceeds to Step 56, where the driving for lens focusing is completed. When the mirror-up-state assurance 35-ms timer times out (Step S57), it is detected in Step S58 whether the release-time-lag stabilizing 70-ms timer has timed out. If it is detected that the 70-ms timer has timed out, the process returns to Step S23, where energization of the shutter leading curtain magnet 110 is performed. Subsequently, a similar sequence of operations is performed in accordance with the aforesaid flow. If the release switch 101 remains on with the continuous-shooting mode selected, photography is continued in accordance with the aforesaid flow.

As is apparent from the foregoing, in accordance with the present preferred embodiment, since the mirror-up operation of the movable mirror utilizes the spring force of the spring member, it is possible to minimize the time domain of a mirror-up time period which varies with the rotational speed of the motor. In addition, without a special actuator, it is possible to minimize variations in the mirror-up time period due to changes in a source voltage, whereby a release time lag can be reduced and stabilized.

In accordance with the above-described embodiment, since there are provided a plurality of motor-energization stop phases for the mirror-down operation of the movable mirror, it is possible to alter a braking position in accordance with variations in the rotational speed of the motor, whereby the stop phase of the cam member can be stabilized.

Accordingly, by selecting a suitable energization stop phase with respect to a variation in the source voltage of the motor, it is possible to reduce variations in the duration of a mirror-up operation, whereby a release time lag can be reduced and stabilized.

In accordance with the above-described embodiment, during the operation of the driving motor, it is possible to detect that the submirror serving as a distance-metering mirror has reached a distance-metering position (the mirror-down position shown in FIG. 1). Accordingly, even if the time required to drive the submirror to its down position varies with variations in the source voltage, it is possible to accurately detect the timing of stabilization of the submirror in the distance-metering position, whereby a distance-metering operation can be executed after the submirror has stabilized. In addition, it is possible to start a distance-metering operation at an earlier time even in the driving sequence of stopping the motor after completion of a shutter charging operation.

The submirror is driven toward the distance-metering position by the motor, and an overcharge is absorbed by means of a second spring member when the submirror comes to rest at the distance-metering position. If the spring force of a first spring member for driving the submirror toward the exposure-retracted position is strongly set, it is possible to minimize the bounds of the submirror which may occur in the distance-metering position as a result of a mirror driving operation. In addition, no large impact noise is produced at the distance-metering position by the mirror driving operation.

What is claimed is:

1. A camera comprising:

(a) a movable mirror arranged to be movable between a finder-viewing position and an exposure-retracted position;

(b) a spring member for applying to said movable mirror a force which causes said movable mirror to move from said finder-viewing position to said exposure-retracted position;

(c) a movement mechanism for causing said movable mirror to move, said movement mechanism including a cam member arranged to be rotated by a drive source and a cam follower arranged in abutment with said cam member, said movement mechanism, during motion of said cam follower in a first direction, causing said movable mirror to move toward said exposure-retracted position by means of the urging force of said spring member and, during motion of said cam follower in a second direction, causing said movable mirror to move toward said finder-viewing position against the urging force of said spring member; and (d) a submirror arranged to be movable with respect to said movable mirror, said submirror being located in a focus detecting position for reflecting subject light toward a focus detecting device when said movable mirror is located in said finder-viewing position, and said submirror being interlockingly located in an exposure-retracted position when said movable mirror is located in said exposure-retracted position.

2. A camera according to claim 1, wherein said movable mirror is pivotally supported.

3. A camera according to claim 1, wherein said cam follower of said movement mechanism includes a first lever arranged in abutment with said cam member and a second lever interlocked with said movable mirror, said first and second levers being supported about a common axis and being arranged to be pulled toward each other by a second spring member.

4. A camera according to claim 3, wherein said cam member is configured to bring about a cam displacement which permits said movable mirror to be forced against a stopper by the urging force of said second spring member upon completion of driving of said movable mirror toward said finder-viewing position.

5. A camera according to claim 1, further comprising phase detecting means for detecting a predetermined phase of said cam member.

6. A camera according to claim 5, wherein said drive source of said movement mechanism is a motor, the rotation of which is controlled on the basis of detection information provided by said phase detecting means.

7. A camera according to claim 1, wherein said spring member is charged in interlocked relation to the movement of said movable mirror from said exposure-retracted position to said finder-viewing position.

8. A camera according to claim 1, wherein said submirror is moved by a toggle spring mechanism which switches its urging direction in interlocked relation to the movement of said movable mirror, so that said submirror moves between said focus detecting position and said exposure-retracted position in interlocked relation to the movement of said movable mirror.

9. A camera comprising:

(a) a movable mirror arranged to be movable between a focus detecting position and an exposure-retracted position;

(b) a focus detecting device arranged to receive subject light reflected by said movable mirror when said movable mirror is located in said focus detecting position;

(c) a spring member for applying to said movable mirror a force which causes said movable mirror to move from said focus detecting position to said exposure-retracted position as well as a force which causes said movable mirror to move from said exposure-retracted position to said focus detecting position; and (d) a movement mechanism for causing said movable mirror to move, said movement mechanism including a cam member arranged to be rotated by a drive source and a cam follower arranged in abutment with said cam member, said movement mechanism, during motion of said cam follower in a first direction, causing said movable mirror to move toward said exposure-retracted position by means of the urging force of said spring member and, during motion of said cam follower in a second direction, causing said movable mirror to move toward said focus detecting position against the urging force of said spring member.

10. A camera according to claim 9, wherein said movable mirror is pivotally supported.

11. A camera according to claim 9, wherein said cam follower of said movement mechanism includes a first lever arranged in abutment with said cam member and a second lever interlocked with said movable mirror, said first and second levers being supported about a common axis and being arranged to be pulled toward each other by a second spring member.

12. A camera according to claim 9, further comprising phase detecting means for detecting a predetermined phase of said cam member.

13. A camera according to claim 12, wherein said drive source of said movement mechanism is a motor, the rotation which is controlled on the basis of detection information provided by said phase detecting means.

* * * * *

UNITED STATES PATENT AND TRADEMARK OFFICE
CERTIFICATE OF CORRECTION

PATENT NO. : 5,479,235
DATED : December 26, 1995
INVENTOR(S) : Shousuke HARAGUCHI It is certified that error appears in the above-indentified patent and that said Letters Patent is hereby corrected as shown below:

COLUMN 1:

Line 47, "and" should be deleted.

COLUMN 2:

Line 1, "strengthened. A" should read --strengthened, a--; and

Line 33, "position" should read --position and--.

COLUMN 3:

Line 7, "12(d)," should read --12(a),--, and "12(a)" should read --12(d)--.

COLUMN 4:

Line 55, "am" should read --arm--.

COLUMN 12:

Line 13, "(Step)." should read --(Step 19).--; and

Line 26, "passes Step" should read --passes (Step--.

UNITED STATES PATENT AND TRADEMARK OFFICE
CERTIFICATE OF CORRECTION

PATENT NO. : 5,479,235
DATED : December 26, 1995
INVENTOR(S) : SHOUSUKE HARAGUCHI It is certified that error appears in the above-indentified patent and that said Letters Patent is hereby corrected as shown below:

<u>COLUMN 16</u>:

Line 15, "which" should read --of which--.

Signed and Sealed this

Fourth Day of June, 1996

Attest:

BRUCE LEHMAN

Attesting Officer      Commissioner of Patents and Trademarks